United States Patent [19]
Divisi

[11] Patent Number: 6,095,775
[45] Date of Patent: Aug. 1, 2000

[54] SINGLE-ACTING MANUAL PUMP FOR LUBRICATION LINE, WITH DEFORMABLE VALVE ELEMENT

[75] Inventor: Walter Divisi, Egham, United Kingdom

[73] Assignee: Dropsa, S.p.A., Milan, Italy

[21] Appl. No.: 09/010,912

[22] Filed: Jan. 22, 1998

[30] Foreign Application Priority Data

Jan. 22, 1997 [IT] Italy .................................. MI97A0114

[51] Int. Cl.$^7$ ............................. F04B 39/10; F04B 53/10
[52] U.S. Cl. ............................................. 417/564; 417/560
[58] Field of Search .................................... 417/564, 560, 417/566; 137/512.15, 453

[56] References Cited

U.S. PATENT DOCUMENTS

| | | | |
|---|---|---|---|
| 2,902,049 | 9/1959 | Ilfrey et al. | 137/512.1 |
| 3,179,124 | 4/1965 | Haring | 137/516.11 |
| 3,270,687 | 9/1966 | Hettinga | 103/178 |
| 4,185,946 | 1/1980 | Mitchell | 417/254 |
| 4,452,379 | 6/1984 | Bundschuh | 222/207 |
| 4,489,861 | 12/1984 | Saito et al. | 222/207 |

FOREIGN PATENT DOCUMENTS

| | | | |
|---|---|---|---|
| 1254904 | 1/1961 | France | 417/566 |
| 2105725 | 4/1972 | France | F16K 7/00 |
| 2660022 | 9/1991 | France | F04B 47/04 |
| 1032043 | 6/1958 | Germany | 47/19 |

*Primary Examiner*—Timothy S. Thorpe
*Assistant Examiner*—David J. Torrente
*Attorney, Agent, or Firm*—Steinberg, Raskin & Liberchuk, P.C.

[57] ABSTRACT

A single-acting manual pump for feeding lubricant to metering units provided in a lubrication line, of the type comprising a body (10) housing a piston (1) movable within a chamber (2) against the action of elastic means (3), and unidirectional valve means (4) provided in correspondence with at least one entry aperture (5) and at least one exit aperture (6) formed in a portion (2A) of said chamber (2), said means being arranged to enable a predefined quantity of lubricant to enter said portion (2A) of the chamber (2) from a reservoir (7) when the piston is raised, and to enable said quantity of lubricant to leave towards a tubular delivery channel (8A, B, C) when the piston (1) is released to return to its rest position by the action of said elastic means. The valve means (4) comprise, at least in correspondence with the entry apertures (5) and exit apertures (6) of said portion (2A) of the chamber (2), valve elements (4A, B) which are at least partially deformable by the effect of the pressure variation generated within said portion (2A) of the chamber (2) by the movement of said piston (1).

9 Claims, 2 Drawing Sheets

SINGLE-ACTING MANUAL PUMP FOR LUBRICATION LINE, WITH DEFORMABLE VALVE ELEMENT

FIELD OF THE INVENTION

The present invention relates to a manual pump, and in particular to a manual pump for a lubrication line.

BACKGROUND OF THE INVENTION

Known manual pumps of the aforesaid type comprise a relatively large number of parts, they therefore being of complicated assembly and requiring a lengthy time for their fitting.

The unidirectional valve means used in known pumps are generally of the ball type, these also being of relatively difficult assembly. Moreover in known pumps separate ball valves must be provided for the entry and exit of the pumped lubricant.

In some known pumps, the piston drive rod also acts as the conveying channel for the pumped lubricant, so further complicating the pump construction.

OBJECTS AND SUMMARY OF THE INVENTION

An object of this invention is to provide a single-acting manual lubricant feed pump which is of simple construction and easy assembly, so reducing the time and cost of pump manufacture.

A further object is to provide a pump having a small number of components, in particular with regard to the entry and exit valve means for the pumped lubricant, and which is easy and quick to assemble, with a resultant low production time and cost.

The above objects, as well as other objects and advantages of the present invention will be apparent from the following disclosure.

BRIEF DESCRIPTION OF THE DRAWINGS

The invention will be more apparent from the accompanying drawings, which are provided by way of non-limiting example in which.

DETAILED DESCRIPTION OF THE PREFERRED EMBODIMENTS

Figure 1:
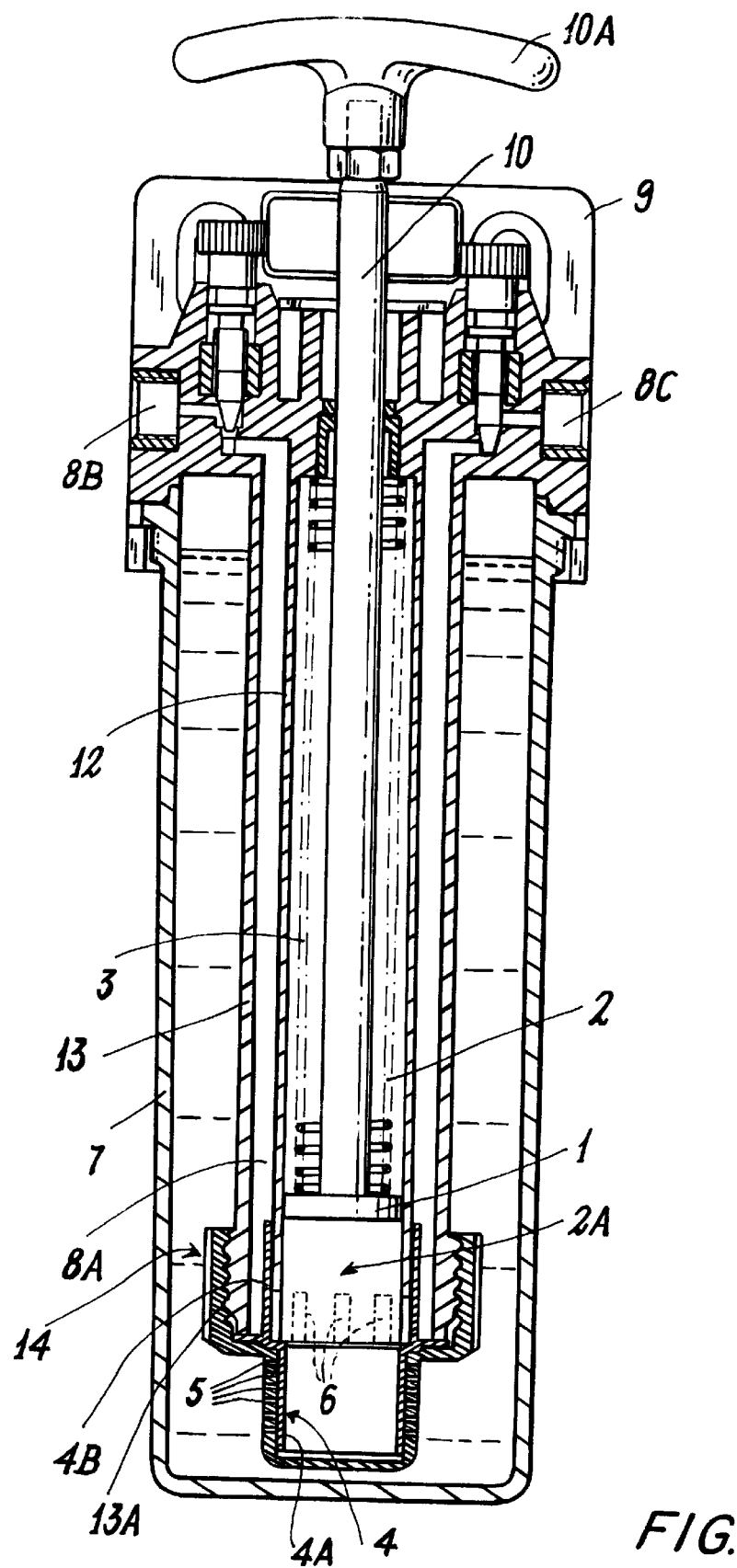
FIG. 1 is a schematic longitudinal section through a pump according to the invention.
Figure 2:
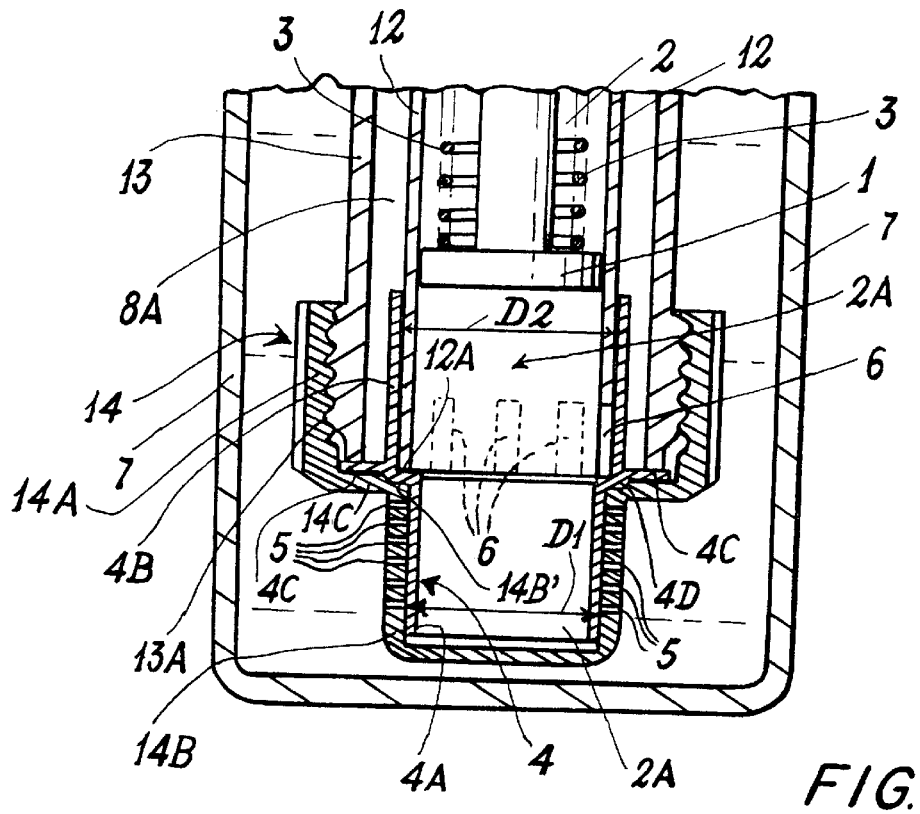
FIG. 2 is an enlarged schematic view of the lower part of FIG. 1.

With reference to said figures, a pump according to the invention comprises a piston 1 movable within a chamber 2 against the action of a spring 3, and a valve element 4 provided in correspondence with entry apertures 5 and exit apertures 6 formed in a portion 2A of said chamber. The valve element 4 enables a predefined quantity of lubricant to enter the chamber portion 2A from a reservoir 7 when the piston is raised, and to leave towards a tubular delivery channel 8A, B, C when the piston is released to return to its rest position (FIGS. 1, 2) by the action of the spring 3.

The pump also comprises an endpiece 9 of substantially traditional type which comprises a hole for passage of the rod 10 connected to the piston 1, two usual delivery ports 8B, C for the pressurized oil, and preferably two usual delivery adjustment valves 11. The reservoir 7 containing the lubricant to be pumped, for example oil or grease, is fixed to the endpiece 9, for example by snap-fitting.

Figure 3:
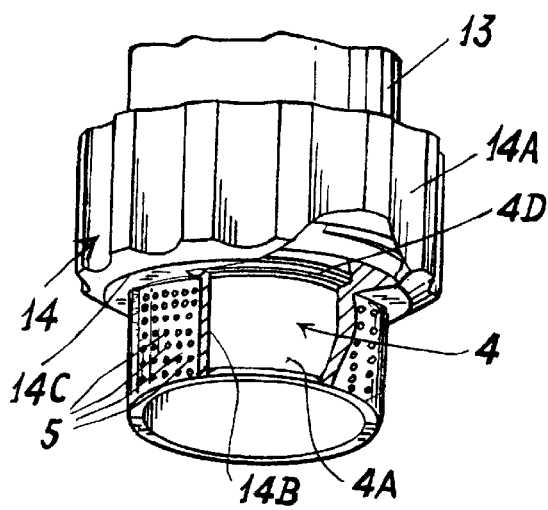
FIG. 3 is a partly broken-away perspective view thereof.
Figure 4:
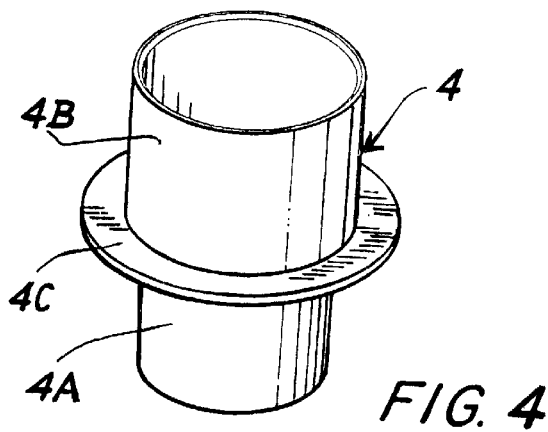
FIG. 4 is a perspective view of the pump valve means.

From the base of the endpiece 9 there centrally extends a first tubular wall 12 bounding the chamber 2 in which the piston slides, and a second tubular wall 13, more outer than but concentric to the first, and defining with the first wall 12 the delivery conduit 8A connected to the exit ports 8B and 8C. In correspondence with the lower edge of the first tubular wall 12 there are provided the apertures 6 enabling the pressurized lubricant to emerge from the chamber portion 2A (as explained in detail hereinafter). The lower part of the second tubular wall 13 comprises a thread 13A for removably connecting to it a filter-plug 14 for closing the chamber 2 and conduit 8A. The filter-plug has an upper part 14A (FIG. 3) with an internal thread for engagement with the thread 13A on the second tubular wall 13, and a smaller lower part 14B comprising along its side wall a plurality of holes 5 acting as apertures for lubricant entry into the chamber portion 2A, while at the same time filtering off any impurities present in the lubricant contained in the reservoir. The two parts 14A and B of the plug 14 are connected together by a wall 14C.

The valve element 4 is tubular and comprises two parts 4A, B with their outer diameters equal respectively to the inner diameter D1 of the lower part 14B of the plug 14 and to the outer diameter D2 of the first tubular wall 12. In correspondence with the joint between the two parts 4A, B of the valve element 4 there are provided an annular connection wall 4D (FIG. 2) and a flat outer wall 4C. The plug 14 and the valve element 4 are dimensioned such that when the plug is screwed to the second tubular wall 13 (FIGS. 1 and 2), the valve element becomes locked between the lower edge 12A of the first tubular wall 12 and the upper edge 14B' of the second part 14B of the plug 14, while at the same time the cylindrical walls of the two parts 4A and 4B of the plug sealedly close the entry apertures 5 and exit apertures 6. By virtue of the annular wall 4C, the valve element also ensures a perfect seal between the plug 14 and the second tubular wall 13.

The valve element 4 is constructed of an elastic, preferably plastic, material of any known type suitable for the purpose.

The pump operates in the following manner. Using the handgrip 10A the piston 1 is pulled upwards, with the result that a vacuum is created in the lower portion 2A of the chamber 2 in which the piston slides, and inwardly deforms the part 4A of the valve element 4, to "detach" that part from the wall of the filter-plug 4 against which it normally sealedly adheres. In this manner the lubricant present in the reservoir is drawn into the lower part 2A of the piston slide chamber. Then, on releasing the handgrip 10A, the piston 1 is urged downwards into its rest position by the spring 3, to compress the oil which had filled the lower part 2A of the chamber 2. The pressurized lubricant both returns the lower part 4A of the valve element against the lower part of the filter-plug 14 to sealedly close the entry apertures 5, and also expands the upper part 4B of the valve element, so as to uncover the exit apertures 6 and enable the lubricant to flow into the delivery channel. When the lubricant pressure in the chamber portion 2A falls because of lubricant outflow, the upper part 4B of the valve element 4 returns to adhere against the tubular wall 12, to sealedly close the exit apertures 6.

It should be noted that the quantity of lubricant delivered by the pump can be varied by varying the stroke of the piston 1.

In a possible modification of the aforedescribed embodiment, the tubular element 4 could comprise two separate parts 4A and 4B connected in any known manner to the pump body, and/or said parts could be formed in such a manner that only one portion of them is elastically deformable by the effect of the pressure variations with the chamber 2.

I claim:

1. A single-acting manual pump for feeding lubricant to metering units provided in a lubrication line, of the type comprising a piston (1) movable within a chamber (2) against the action of elastic means (3), and unidirectional valve means (4) provided in correspondence with at least one entry aperture (5) and at least one exit aperture (6) formed in a portion (2A) of said chamber (2), said unidirectional valve means (4) being arranged to enable a pre-defined quantity of lubricant to enter said portion (2A) of the chamber (2) from a reservoir (7) when the piston is raised, and to enable said quantity of lubricant to leave towards a tubular delivery channel (8A, B, C) when the piston (1) is released to return to its rest position by the action of said elastic means, wherein the valve means (4) comprises, at least in correspondence with the entry apertures (5) and exit apertures (6) of said portion (2A) of the chamber (2), valve elements (4A, B) which are at least partially deformable by the effect of pressure variation generated within said portion (2A) of the chamber (2) by movement of said piston (1) and wherein said at least one entry aperture (5) is provided in a wall of a plug (14) which is removably connected in correspondence with the slide chamber (2).

2. A pump as claimed in claim 1, wherein the valve elements (4A, B) are of substantially tubular form.

3. A pump as claimed in claim 2, wherein the two valve elements (4A, B) are formed integrally with each other.

4. A pump as claimed in claim 3, wherein the valve elements (4A, B) have different diameters.

5. A pump as claimed in claim 2, wherein at least one of the valve elements (4A, B) comprises an integral outer lateral wall (4C) acting as a seal gasket.

6. A pump as claimed in claim 1, wherein the plug (14) comprises a plurality of small-dimension entry apertures (5) arranged to act as a filter for the oil entering the portion (2A) of the slide chamber (2) for the piston (1).

7. A pump as claimed in claim 1, wherein a tube-shaped valve element adheres to the inner face of that wall of the plug (14) which contains the entry apertures (5).

8. A pump as claimed in claim 1, wherein the plug (14) is formed in such a manner as to maintain a connection portion (4D) between the two constituent different-diameter coaxial tubular parts (4A, 4B) of the valve element (4) in contact with the lower edge (12A) of the piston slide chamber (2) and in contact with a wall (14C) of the plug.

9. A manual pump as claimed in claim 3, wherein two coaxial different-diameter valve elements (4A, B) are provided connected together by a connection wall (4D) and comprising an outer annular wall (4C) acting as a seal gasket, the greater-diameter valve element (4B) sealedly adhering to an outer surface portion of a wall (12) containing the exit apertures (6) and bounding the portion (2A) of the chamber within which the piston (1) slides, the smaller-diameter other valve element (4A) sealedly adhering to a different inner-surface portion of a closure wall containing the entry apertures (5) to said chamber portion (2A).

* * * * *